United States Patent
Petrovic

(10) Patent No.: US 11,358,130 B2
(45) Date of Patent: Jun. 14, 2022

(54) SURFACE-TREATED SILICOALUMINOPHOSPHATE MOLECULAR SIEVE

(71) Applicant: BASF Corporation, Florham Park, NJ (US)

(72) Inventor: Ivan Petrovic, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/917,424

(22) Filed: Jun. 30, 2020

(65) Prior Publication Data

US 2020/0330966 A1 Oct. 22, 2020

Related U.S. Application Data

(63) Continuation of application No. PCT/IB2019/050032, filed on Jan. 2, 2019.

(60) Provisional application No. 62/613,220, filed on Jan. 3, 2018.

(51) Int. Cl.

| | |
|---|---|
| *B01J 29/85* | (2006.01) |
| *B01D 53/94* | (2006.01) |
| *B01J 21/04* | (2006.01) |
| *B01J 35/04* | (2006.01) |
| *B01J 35/10* | (2006.01) |
| *B01J 37/02* | (2006.01) |
| *B01J 37/10* | (2006.01) |
| *B01J 37/30* | (2006.01) |
| *C01B 39/54* | (2006.01) |
| *F01N 3/20* | (2006.01) |
| *F01N 3/28* | (2006.01) |

(52) U.S. Cl.
CPC .......... *B01J 29/85* (2013.01); *B01D 53/9418* (2013.01); *B01J 21/04* (2013.01); *B01J 35/04* (2013.01); *B01J 35/1019* (2013.01); *B01J 37/0244* (2013.01); *B01J 37/0246* (2013.01); *B01J 37/0248* (2013.01); *B01J 37/10* (2013.01); *B01J 37/30* (2013.01); *C01B 39/54* (2013.01); *F01N 3/20* (2013.01); *F01N 3/2066* (2013.01); *F01N 3/2807* (2013.01); *B01D 2255/2092* (2013.01); *B01D 2255/20707* (2013.01); *B01D 2255/20715* (2013.01); *B01D 2255/20761* (2013.01); *B01D 2255/30* (2013.01); *B01D 2255/50* (2013.01); *B01D 2255/9155* (2013.01); *B01D 2255/9207* (2013.01); *B01J 2229/183* (2013.01); *F01N 2330/02* (2013.01); *F01N 2330/30* (2013.01); *F01N 2370/04* (2013.01); *F01N 2610/02* (2013.01); *F01N 2610/1453* (2013.01)

(58) Field of Classification Search
CPC ... B01J 21/04; B01J 29/85; B01J 35/04; B01J 35/1019; B01J 37/10; B01J 37/30; B01J 37/0244; B01J 37/0246; B01J 37/0248; B01J 2229/183; C01B 39/54; B01D 53/9418; B01D 2255/20707; B01D 2255/20715; B01D 2255/20761; B01D 2255/2092; B01D 2255/30; B01D 2255/50; B01D 2255/9155; B01D 2255/9207; F01N 3/2066; F01N 3/2807; F01N 3/20; F01N 2330/30; F01N 2370/04; F01N 2610/02; F01N 2610/1453
USPC ...... 502/214, 60, 63, 64, 66, 65, 69, 73, 78; 423/713

See application file for complete search history.

(56) References Cited

U.S. PATENT DOCUMENTS

| | | | |
|---|---|---|---|
| 8,404,203 B2 * | 3/2013 | Bull | B01J 29/072 |
| | | | 423/213.5 |
| 9,358,503 B2 * | 6/2016 | Wan | F01N 3/035 |
| 2013/0336866 A1 | 12/2013 | Soeger et al. | |
| 2015/0118115 A1 | 4/2015 | Chen et al. | |
| 2015/0352492 A1 | 12/2015 | Andersen et al. | |
| 2015/0375215 A1 | 12/2015 | Fedeyko et al. | |
| 2017/0128913 A1 | 5/2017 | Goffe | |
| 2017/0182482 A1 | 6/2017 | Blakeman et al. | |

FOREIGN PATENT DOCUMENTS

| | | |
|---|---|---|
| CN | 105944755 | 9/2016 |
| EP | 2635779 B1 | 9/2013 |
| EP | 3409359 A2 | 12/2018 |
| JP | H0871428 A | 3/1996 |
| WO | WO 2017/134581 | 8/2017 |

OTHER PUBLICATIONS

European Search Report for EP Patent Application No. 19735692.6, dated Jul. 16, 2021, 4 pages.

\* cited by examiner

*Primary Examiner* — Elizabeth D Wood
(74) *Attorney, Agent, or Firm* — Finnegan, Henderson, Farabow, Garrett & Dunner LLP

(57) ABSTRACT

A catalyst material for abatement of exhaust gas emissions from a lean burn engine is provided, the catalyst material including a metal-exchanged SAPO-34 material, and an oxide layer at least partially covering an outside surface of the SAPO-34 material, wherein the oxide layer is not substantially blocking the pores of the SAPO-34 material.

21 Claims, 6 Drawing Sheets

SURFACE-TREATED SILICOALUMINOPHOSPHATE MOLECULAR SIEVE

CROSS-REFERENCE TO RELATED APPLICATIONS

This application is a continuation of International Application No. PCT/IB2019/050032, filed Jan. 2, 2019, which International Application was published by the International Bureau in English on Jul. 11, 2019, as WO 2019/135182, and application claims priority from U.S. Provisional Application No. 62/613,220, filed on Jan. 3, 2018, which applications are hereby incorporated in their entirety by reference in this application.

FIELD OF THE INVENTION

The present invention relates to catalyst materials comprising a metal exchanged SAPO material, methods for the preparation and use of such catalyst compositions, and catalyst articles and systems employing such catalyst compositions. The materials and catalytic articles are useful in methods and systems to catalyze the reduction of nitrogen oxides in the presence of a reductant.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon. The HC content of exhaust can vary depending on engine type and operating parameters, but typically includes a variety of short-chain hydrocarbons such as methane, ethene, ethyne, propene, and the like.

Platinum group metal (PGM) based catalysts are useful in treating the exhaust of diesel engines to convert hydrocarbon and carbon monoxide by catalyzing the oxidation of these pollutants to carbon dioxide and water. In addition, oxidation catalysts that contain platinum promote the oxidation of NO to $NO_2$. For heavy-duty diesel systems, such catalysts are generally contained within regeneration diesel oxidation catalyst (DOC) systems, catalyst soot filter (CSF) systems, or combined DOC-CSF systems. These catalyst systems are placed in the exhaust flow path from diesel power systems to treat the resulting exhaust before it vents to the atmosphere. Typically, diesel oxidation catalysts are deposited on ceramic or metallic substrates. For additional reduction of $NO_x$ species, such systems also typically include at least one Selective Catalytic Reduction (SCR) catalyst downstream from the DOC catalyst. In light and medium-duty applications, the system may contain a lean $NO_x$ trap (LNT) which serves to store and reduce $NO_x$, as well as remove carbon monoxide and unburned hydrocarbons from the exhaust stream.

Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (3.8 Angstroms) accessible through its 3-dimensional porosity. A cage like structure results from the connection of double six-ring building units by 4-rings.

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Selective Catalytic Reduction, using ammonia or ammonia precursor as reducing agent is believed to be a viable technique for the removal of nitrogen oxides from the exhaust of diesel vehicles. In typical exhaust, the nitrogen oxides are mainly composed of NO (>90%), so the SCR catalyst favors the conversion of NO and $NH_3$ into nitrogen and water. Two major challenges in developing catalysts for the automotive application of the ammonia SCR process are to provide a wide operating window for SCR activity, including low temperatures of from 2000° C. and higher and improvement of the catalyst's hydrothermal stability for temperatures above 500° C. As used herein hydrothermal stability refers to retention of a material's capability to catalyze the SCR of $NO_x$, with a preference for the retention to be at least 85% of the material's $NO_x$ conversion ability prior to hydrothermal aging.

Metal-promoted zeolite catalysts including, among others, iron-promoted and copper-promoted zeolite catalysts, where, for instance, the metal is introduced via ion-exchange, for the selective catalytic reduction of nitrogen oxides with ammonia are known. Iron-promoted zeolite beta has been an effective catalyst for the selective reduction of nitrogen oxides with ammonia. Unfortunately, it has been found that under harsh hydrothermal conditions, such as reduction of $NO_x$ from gas exhaust at temperatures exceeding 500° C., the activity of many metal-promoted zeolites, such as Cu and Fe versions of ZSM-5 and Beta, begins to decline. This decline in activity is believed to be due to destabilization of the zeolite such as by dealumination and consequent loss of metal-containing catalytic sites within the zeolite.

To maintain the overall activity of $NO_x$ reduction, increased levels of the washcoat loading of the iron-promoted zeolite catalyst must be provided. As the levels of the zeolite catalyst are increased to provide adequate $NO_x$ removal, there is an obvious reduction in the cost efficiency of the process for $NO_x$ removal as the costs of the catalyst rise. As such, there is a desire to provide catalyst materials which offer improved low temperature SCR activity and/or improved hydrothermal durability over existing zeolitic materials, for example, catalyst materials which are stable at temperatures up to at least about 650° C. and higher, for example in the range of about 700° C. to about 800° C. and up to about 900° C. Moreover, since diesel engines operate under transient conditions, there is a desire to provide materials that exhibit high performance over a wide temperature range, from as low as 200° C. up to about 600° C. Thus, while existing technologies provide high temperature performance, there is a need for materials that can offer low temperature performance in predominantly NO feeds combined with hydrothermal stability. Low temperature performance is important for cold start and low engine load conditions.

While silico-alumino-phosphate (SAPO) materials have attracted some interest for SCR of $NO_x$, one limitation of these materials is that these materials can become unstable when exposed to humid or moist environments at temperatures below 100° C. As such, there is a continuing need in the art to provide a catalyst which exhibits high stability when exposed to low temperature, for example, 100° C. or lower, aging in the presence of steam since these conditions occur during operation of diesel engines. Accordingly, the present invention provides catalyst materials which exhibit high temperature aging stability, as well as significantly improved stability and performance after low temperature hydrothermal aging.

SUMMARY OF THE INVENTION

The present invention is directed toward a catalyst material for abatement of exhaust gas emissions from a lean burn engine. The catalyst material of the present invention can comprise a porous support material (e.g., metal-exchanged SAPO-34 material), and an oxide layer at least partially covering an outside surface of the SAPO-34 material, wherein the oxide layer is not substantially blocking the pores of the SAPO-34 material. In various embodiments of the present invention the SAPO-34 material can be metal exchanged with a metal selected from Cu, Fe, Co, Ce, Mn and Ni. In certain embodiments, the metal is Cu present at a loading in the range of 2 and 8% by weight.

In various embodiments of the present invention, the oxide layer can comprise at least one of $Al_2O_3$, $SiO_2$, $ZrO_2$, and $TiO_2$. In some embodiments, the oxide layer can be approximately 0.1 to about 50 nm in thickness, or about 0.1 to about 25 nm in thickness, or about 0.1 to about 15 nm in thickness.

A catalytic article comprising the catalyst materials disclosed herein in a washcoat deposited on a honeycomb substrate is also provided herein. In some embodiments, the honeycomb substrate can comprise a wall flow filter substrate. In certain embodiments, the honeycomb substrate can comprise a flow through substrate. An exhaust gas treatment system comprising the catalytic article disclosed herein disposed downstream from a diesel engine and a reductant source (e.g., a reductant injector or the passive SCR application where stored $NH_3$ from an upstream catalyst is utilized for SCR reaction) that adds a reductant to an exhaust gas stream from the engine is also provided.

A process for modifying a selective catalytic reduction catalyst material comprising a metal-exchanged SAPO-34 material is further provided herein. The process can include using at least one cycle of a surface deposition method to deposit an oxide layer on at least a portion of an exposed outer surface of the SAPO-34 material, wherein the oxide layer does not substantially block the pores of the SAPO-34 material. In some embodiments, the surface deposition method can be selected from the group consisting of atomic layer deposition (ALD), chemical vapor deposition (CVD), particle vapor deposition (PVD), ion-beam assisted deposition (IBAD), and combinations thereof. In certain embodiments of the present invention, an atomic layer deposition process is used to deposit an oxide layer on at least a portion of an exposed outer surface of the SAPO-34 material.

In various embodiments, at least 60% of the exposed outer surface of the SAPO-34 material can be coated with the oxide layer. In some embodiments, the oxide layer can comprise at least one of $Al_2O_3$, $SiO_2$, $ZrO_2$, and $TiO_2$.

In various embodiments of the present invention, the oxide layer deposited in each cycle of the surface deposition method(s) can be approximately 0.1 to about 10 nm, or about 0.1 to about 1 nm in thickness. In some embodiments, more than one deposition cycles can be applied to the porous support material (e.g., SAPO-34 material). For example, 5 deposition cycles or 10 deposition cycles, or more cycles can be used to deposit the oxide layer on at least a portion of the exterior surface of the porous support material.

In some embodiments, the surface deposition method can be run at a process temperature of about 100° C. to about 250° C., or about 120° C. to about 180° C. In certain embodiments, the surface deposition method can be run at a process temperature of about 150° C.

The invention includes, without limitation, the following embodiments:

Embodiment 1

A catalyst material for abatement of exhaust gas emissions from a lean burn engine, the catalyst material comprising: a metal-exchanged SAPO-34 material; and an oxide layer at least partially covering an outside surface of the SAPO-34 material; wherein the oxide layer is not substantially blocking the pores of the SAPO-34 material.

Embodiment 2

A catalyst material of any preceding embodiment, wherein the oxide layer comprises at least one of $Al_2O_3$, $SiO_2$, $ZrO_2$, and $TiO_2$.

Embodiment 3

A catalyst material of any preceding embodiment, wherein the oxide layer is approximately 0.1 to about 50 nm in thickness.

Embodiment 4

A catalyst material of any preceding embodiment, wherein the oxide layer is approximately 0.1 to 15 nm in thickness.

Embodiment 5

A catalyst material of any preceding embodiment, wherein the metal is selected from Cu, Fe, Co, Ce, Mn, and Ni.

Embodiment 6

A catalyst material of any preceding embodiment, wherein the metal is Cu present at a loading in the range of 2 and 8% by weight.

Embodiment 7

A catalytic article comprising the catalyst material of any preceding embodiment in a washcoat deposited on a honeycomb substrate.

Embodiment 8

A catalyst article of any preceding embodiment, wherein the honeycomb substrate comprises a wall flow filter substrate.

Embodiment 9

A catalyst article of any preceding embodiment, wherein the honeycomb substrate comprises a flow through substrate.

Embodiment 10

An exhaust gas treatment system comprising the catalytic article of any preceding embodiment disposed downstream from a diesel engine and a reductant source that adds a reductant to an exhaust gas stream from the engine.

Embodiment 11

A process for modifying a selective catalytic reduction catalyst material comprising a metal-exchanged SAPO-34 material, the process comprising: using at least one cycle of a surface deposition method to deposit an oxide layer on at least a portion of an exposed outer surface of the SAPO-34 material, wherein the oxide layer does not substantially block the pores of the SAPO-34 material.

Embodiment 12

A process of any preceding embodiment, wherein the surface deposition method is selected from the group consisting of atomic layer deposition (ALD), chemical vapor deposition (CVD), particle vapor deposition (PVD), ion-beam assisted deposition (IBAD), and combinations thereof.

Embodiment 13

A process of any preceding embodiment, wherein at least 60% of the exposed outer surface of the SAPO-34 material is coated with the oxide layer.

Embodiment 14

A process of any preceding embodiment, wherein the oxide layer comprises at least one of $Al_2O_3$, $SiO_2$, $ZrO_2$, and $TiO_2$.

Embodiment 15

A process of any preceding embodiment, wherein the oxide layer deposited in the at least one cycle is approximately 0.1 to about 1 nm in thickness.

Embodiment 16

A process of any preceding embodiment, wherein 5 deposition cycles are used to deposit the oxide layer.

Embodiment 17

A process of any preceding embodiment, wherein 10 deposition cycles are used to deposit the oxide layer.

Embodiment 18

A process of any preceding embodiment, wherein the surface deposition method is run at a process temperature of about 100° C. to about 250° C.

Embodiment 19

A process of any preceding embodiment, wherein the surface deposition method is run at a process temperature of about 120° C. to about 180° C.

Embodiment 20

A process of any preceding embodiment, wherein the surface deposition method is run at a process temperature of about 150° C.

Embodiment 21

A process of any preceding embodiment, wherein the metal is selected from Cu, Fe, Co, Ce, Mn and Ni.

Embodiment 22

A process of any preceding embodiment, wherein the metal is Cu present at a loading in the range of 2 and 8% by weight.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 2:
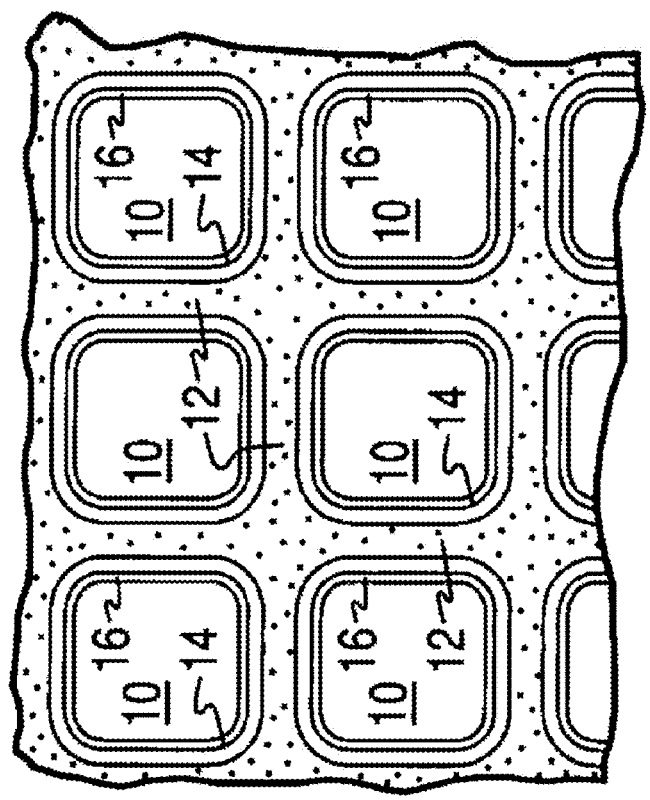
FIG. 2 is a partial cross-sectional view enlarged relative to FIG. 1 and taken along a plane parallel to the end faces of the carrier of FIG. 1, which shows an enlarged view of a plurality of the gas flow passages shown in FIG. 1.

The present invention now will be described more fully hereinafter. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents. It is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. By way of example, "a reducing agent" means one reducing agent or more than one reducing agent. Any ranges cited herein are inclusive. The term "about" used throughout this specification are used to describe and account for small fluctuations. For example, the term "about" can refer to less than or equal to 5%, such as less than or equal to 2%, less than or equal to 1%, less than or equal to 0.5%, less than or equal to 0.2%, less than or equal to +0.1% or less than or equal to 0.05%. All numeric values herein are modified by the term "about," whether or not explicitly indicated. A value modified by the term "about" of course includes the specific value. For instance, "about 5.0" must include 5.0. The term "substantially" similarly is used to describe and account for small fluctuations. Accordingly, where a composition is referred to as "substantially free" of a given component, unless otherwise specified, this can mean, e.g., that the composition comprises less than about 5%, such as less than about 2%, less than about 1%, less than about 0.5%, less than about 0.1%, or less than about 0.05% of that component by weight of the composition. All measurements herein are performed at ambient conditions, 25° C. and 1 atm of pressure, unless otherwise indicated.

Where ranges in the claims of this application do not find explicit support in the specification, it is intended that such claims provide their own disclosure as support for claims or teachings in a later amendment of this application. Numerical ranges of ingredients that are bounded by zero on the lower end (for example, 0-5 weight % Cu component) are intended to provide support for the concept "up to [the upper limit]," for example "up to 5 weight percent % Cu component," vice versa, as well as a positive recitation that the ingredient in question is present in an amount that does not exceed the upper limit. An example of the latter is "comprises Cu, provided the amount does not exceed 5 weight percent." A recitation such as "8-25 weight percent (PGM+ second component+optional metal component)" means that any or all of PGM, second component, and/or optional metal component may be present in an amount of 8-25 weight percent of the composition.

As used herein, the term "molecular sieves" refers to materials based on an extensive three-dimensional network of metal ions connected by oxygen atoms containing generally tetrahedral type sites and having a pore distribution, as discussed in more detail below. As used herein, the term "SAPO material" refers to a silico-alumino-phosphate molecular sieve, which is a porous crystalline molecular sieve wherein silicon is substituted into an alumino-phosphate framework. As used herein, the term "as-synthesized" refers to a SAPO material, e.g., SAPO-34 material that is uncalcined, i.e., still contains the structure directing agent or template. The as-synthesized SAPO material is not stabilized, and, upon calcination and exposure to moisture, part of the framework hydrolyzes.

"BET surface area" has its usual meaning of referring to the Brunauer, Emmett, Teller method for determining surface area by $N_2$ adsorption. The BET surface area refers to the overall surface area, i.e., the total of t-plot micropore or zeolitic surface area (ZSA) and external surface area (MSA), such that BET=ZSA+MSA.

"ZSA" as used herein is the "zeolitic surface area," and can be expressed in $m^2/g$, $m^2/in^3$, or simply in $m^2$ where objects of equal size by weight or volume are compared. ZSA refers to surface area associated primarily with the micropores of a zeolite (typically about 2 nm or less in diameter). Although "ZSA" refers by name specifically to "zeolite" surface area, this term is intended to be more broadly applicable to molecular sieve surface areas generally. Methods of evaluating ZSA are disclosed throughout the present specification.

"tZSA" as used herein is the "total zeolitic surface area," and is expressed in $m^2$. tZSA also refers to surface area associated primarily with the micropores of a zeolite. tZSA can be calculated by multiplying the ZSA by the total weight of the tested core to yield tZSA in, e.g., units of $m^2$. tZSA, although referring by name specifically to total "zeolite" surface area, is intended to be more broadly applicable to total molecular sieve surface areas generally.

"Volumetric ZSA" expressed in $m^2/in^3$ of the tested core can be also used when comparing certain catalytic articles, such as coated substrates, e.g., honeycombs, wall-flow filters, and the like. Volumetric ZSA can be obtained by dividing the tZSA by the volume of the tested core to yield volumetric ZSA in, e.g., units of $m^2/in^3$.

"MSA" as used herein is the "matrix surface area" and can be also expressed in $m^2/g$, $m^2/in^3$, or in $m^2$, as defined above.

MSA refers to surface area associated specifically with the matrix (typically greater than about 2 nm in diameter).

As used herein, the term "substrate" refers to the monolithic material onto a catalyst material is placed, typically in the form of a washcoat containing particles of the catalytic material. A washcoat is formed by preparing slurry containing a specified solids content (e.g., 30-90% by weight) of particles of the catalytic material in a liquid vehicle, which is then coated onto a substrate and dried to provide a washcoat layer.

As used herein, the term "washcoat" has its usual meaning in the art of a thin, adherent coating of a catalytic or other material applied as slurry to a substrate carrier material, such as a honeycomb-type carrier member, which is sufficiently porous to permit the passage of the gas stream being treated.

As used herein, the terms "catalyst" and "catalyst species" refer to materials that promotes a reaction. "Catalytic article" refers to an element that is used to promote a desired reaction. For example, a catalytic article may comprise a washcoat containing catalyst material on a substrate. "Catalyst material" or "catalytic material" refers to a composition that promotes a reaction, for example, a SAPO material exchanged with or containing a promoter metal such as copper which promotes the selective catalytic reduction of nitrogen oxides in the presence of a reductant.

The present invention generally provides a catalyst composition suitable for at least partial reduction of NOx gases. The catalyst compositions disclosed herein comprise a metal-exchanged SAPO material, wherein an oxide layer at least partially covers an outside surface of the SAPO material. The catalyst compositions of the present invention can be prepared and coated onto a catalyst substrate using a washcoat technique as set forth more fully below.

Catalyst Composition

The catalyst compositions disclosed herein generally comprise molecular sieves and, in particular, generally comprise metal-promoted (e.g., Cu-promoted or Cu/Fe-promoted) molecular sieves. The phrase "molecular sieve," as used herein refers to framework materials such as zeolites and other framework materials (e.g. isomorphously substituted materials), which may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. Zeolites and other zeolitic framework materials (e.g. isomorphously substituted materials) may, in particulate form, support catalytic metals. According to one or more embodiments, it will be appreciated that by defining the molecular sieves by their structure type, it is intended to include the structure type and any and all isotypic framework materials such as silico-alumino-phosphate (SAPO), alumino-phosphate (ALPO) and metal-alumino-phosphate (MeAPO) materials having the same structure type, as well as borosilicates, gallosilicates, ferrisilicates, zincsilicates, mesoporous silica materials.

Reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, AlPO, and MeAPO materials, and the broader term "zeolite" is intended to include aluminosilicates and aluminophosphates. Zeolites are crystalline materials, understood to be aluminosilicates with open 3-dimensional framework structures composed of corner-sharing $TO_4$ tetrahedra, where T is Al or Si or P. Zeolites generally comprise silica to alumina (SAR) molar ratios of 2 or greater. Cations that balance the charge of the anionic framework are loosely associated with the framework oxygens, and the remaining pore volume is filled with water molecules. The non-framework cations are generally exchangeable, and the water molecules removable. Zeolites typically have rather uniform pore sizes which, depending upon the type of zeolite and the type and amount of cations included in the zeolite lattice, range from about 3 to 10 Angstroms in diameter.

Molecular sieves can be classified by means of the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In certain embodiments, the structure type is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. Existing intergrowth of these materials, e.g., including, but not limited to AEI-CHA are also intended to be encompassed herein.

In certain embodiments, the molecular sieve may comprise a zeolite or zeotype selected from the group consisting of a chabazite, ferrierite, clinoptilolite, silico-alumino-phosphate (SAPO), beta-zeolite, Y-zeolite, mordenite, faujasite, ZSM-5, mesoporous materials, and combinations thereof. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN. In one or more specific embodiments of the present disclosure, the molecular sieves of the catalyst compositions have the CHA structure type. In particular embodiments, the molecular sieves have the CHA structure type and are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

In some embodiments, the porous support material can be a SAPO material. In certain preferred embodiments, the porous support material of the catalyst compositions disclosed herein is SAPO-34. It is noted that other types of porous support materials can be useful in embodiments of the catalyst compositions described herein. However, for simplicity, the discussion and various examples refer only to SAPO materials when referencing the porous support material.

In one or more embodiments, the SAPO material has a structure type selected from the group consisting of AEI, AFT, AFX, CHA, EAB, ERI, KFI, LEV, SAS, SAT, and SAV. In one or more embodiments, the SAPO material has the CHA structure type. The SAPO material can be selected from SAPO-5, SAPO-11, SAPO-18, SAPO-34, SAPO-37, SAPO-44, SAPO-47. In one or more embodiments, the SAPO material is selected from the group consisting of SAPO-34, SAPO-44, and SAPO-47. In a specific embodiment, the SAPO material comprises SAPO-34.

As referenced herein above, the disclosed catalyst compositions generally comprise molecular sieves (e.g., zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the molecular sieves. Copper participates in the conversion of nitrogen oxides and thus may be a particularly useful metal for exchange. Accordingly, in particular embodiments, a catalyst composition is provided which comprises a copper-promoted molecular sieve, e.g., Cu-SAPO-34. However, the invention is not intended to be limited thereto, and catalyst compositions comprising other metal-promoted molecular sieves are also encompassed hereby.

Promoter metals can generally be selected from the group consisting of alkali metals, alkaline earth metals, transition metals in Groups IIIB, IVB, VB, VIB, VIIB, VIIIB, IB, and IB, Group IIIA elements, Group IVA elements, lanthanides, actinides, and combinations thereof. Certain promoter metals that can, in various embodiments, be used to prepare metal-promoted molecular sieves include, but are not limited to, cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-SAPO-34.

In various embodiments of the present invention, the porous support material can be ion-exchanged with a promoter metal, such as a metal selected from the group consisting of Cu, Fe, Co, Ce, Mn, Ni, and combinations thereof. In certain embodiments of the present invention, the catalyst material comprises a copper exchanged SAPO material. Again, for simplicity purposes, the porous support material of the present invention is referred to as a SAPO material at various instances throughout the description and the Examples, however, this is not intended to be limiting.

In the conventional synthesis of SAPO materials, e.g., SAPO-34, ammonium exchange can be done in an aqueous phase. However, exposure to moisture can deactivate the SAPO material. Accordingly, it can be desirable not to store silicoaluminophosphate molecular sieves in their calcined forms. As such, in one or more embodiments, contact with moisture, and hence deactivation, can be avoided by an in-situ ammonium exchange in the vapor phase.

In various embodiments of the present invention, the SAPO material can be stabilized by subjecting the SAPO material to an in situ vapor-phase ammonium stabilization process. The as-synthesized SAPO material, e.g., SAPO-34, is first freshly calcined, and the sample is then cooled. A low concentration of dry ammonia in an inert gas is passed through the freshly calcined catalyst bed/catalyst precursor to saturation. The now stable $NH_4$-SAPO material, e.g., $NH_4$-SAPO-34, generated through vapor phase is hydrophobic. The material is then ion-exchanged and converted to stabilized metal promoted SAPO materials, e.g. stabilized Cu-SAPO-34. See, e.g., U.S. Pat. Pub. No. 2014/0271452 to Mohanan et al., which is herein incorporated by reference.

Generally, the promoter metal can be present in an amount of about 0.1 to 20% by weight of the catalyst material (the SAPO and the promoter metal), and more specifically in an amount of about 1 to 10% by weight, and more specifically between 2 and 8% by weight, and even more specifically 2 to 5% by weight. In one or more embodiments, the amount promoter metal is at least about 2 wt. % and in even more specific embodiments, at least about 2.5 wt. %, reported on a volatile-free basis. The promoter metal content of a metal-promoted molecular sieve, calculated as the oxide, is, in one or more embodiments, at least about 0.1 wt. %, based on the total weight of the calcined molecular sieve (including promoter) and reported on a volatile-free basis. In specific embodiments, the promoter metal of the first molecular sieve comprises Cu, and the Cu content, calculated as CuO is in the range of about 0.1 wt. % to about 5 wt. %, including about 0.5 wt. % to about 4 wt. %, about 2 wt. % to about 5 wt. %, or about 1 wt. % to about 3 wt. %, in each case based on the total weight of the calcined molecular sieve reported on a volatile free basis. In certain embodiments, the promoter metal is Cu, Fe, or combinations thereof.

In various embodiments of the present invention, an oxide layer can at least partially cover an outside surface of the porous support material (e.g., the SAPO material) of the catalyst material. Without being limited by theory, it is believed that the loss of activity after low temperature aging of a catalyst material comprising a porous SAPO material can in part be due to damage from the outside of the particles of the SAPO material. As such, an ultrathin oxide layer applied to an outside surface of the porous support material can help prevent damage from the outside to the porous support material and thereby reduce the loss of activity of the catalyst material after low temperature aging. In some embodiments, at least about 60%, at least about 70%, at least about 80%, or at least about 90% of the exposed outer surface of the porous support material is coated with the oxide layer.

In various embodiments, the oxide layer can be deposited such that the oxide layer is not substantially blocking the pores of the porous support material. For example, at least about 70%, at least about 80%, or at least about 90% of the pores of a particle of the porous support material can be substantially free of the oxide layer coating such that these pores are open and unblocked. As such, the framework of the particles of the porous support material can be coated with an oxide layer, however, the pores of the substrate are substantially open such that emission gases to be treated by the catalyst material are free to flow into the pores and good catalytic activity is maintained under applicable engine conditions.

Any type of surface deposition method can be used to coat an exterior surface of particles of the porous support material with an ultrathin coating. Surface deposition methods useful in the present invention include, but are not limited to, atomic layer deposition (ALD), chemical vapor deposition (CVD), particle vapor deposition (PVD), ion-beam assisted deposition (IBAD), and combinations thereof.

In various embodiments, particles of the porous support material can have an ultrathin coating applied to an exterior surface thereof using atomic layer deposition methods. See, e.g., the ALD methods disclosed in U.S. Pat. No. 6,613,383 to George et al., which is herein incorporated by reference in its entirety. The porous support material particles can have at least one functional group on the surface that can participate in a reaction sequence that creates an ultrathin coating. For example, the one or more functional groups can include hydroxyl groups, amino groups, and metal-hydrogen bonds. ALD methods are selective, which allows for an ultrathin coating layer to be applied to at least part of the exterior surface of a particle without substantially blocking the pores of the particle.

In various embodiments, each deposition cycle of an ALD process can deposit a coating on the exterior surface of a substrate particle. In some embodiments, multiple deposition cycles (e.g., 1-100 cycles) can be used such that multiple coating layers are applied to the exterior surface of a substrate particle. For example, 1-5 deposition cycles, 5-10 deposition cycles, 10-15 deposition cycles, or more cycles can be used to achieve a final coating having a desired thickness. It is understood that the number of deposition cycles used to apply a coating to the porous support material is dependent on the desired coating thickness for different applications and therefore, there is no limit on the number of deposition cycles that can be used to deposit a final coating layer on the particles of a porous support material. In various embodiments of the present invention, the oxide layer comprises at least one of $Al_2O_3$, $SiO_2$, $ZrO_2$, and $TiO_2$.

In various embodiments, a single deposition cycle can apply a coating having a thickness of about 0.1 to about 10 nm, or about 0.1 to about 1 nm. In certain embodiments, a single deposition cycle can apply a coating having a thickness of about 10 nm or less, about 5 nm or less, or about 1 nm or less. In some embodiments, the coating on the exterior surface of a substrate particle, which can be applied via one or more deposition cycles, can have a total thickness of up to about 100 nm. In certain embodiments, the final coating layer can have a thickness of about 0.1 to about 50 nm, or about 0.1 to about 35 nm, or about 0.1 to about 25 nm in thickness, or about 0.1 to about 15 nm in thickness, or about 0.1 to about 10 nm, or about 0.1 to about 1 nm. In some embodiments, the final coating layer can have a thickness of about 50 nm or less, about 25 nm or less, or about 15 nm or less.

Method of Making Catalyst Composition

According to the present disclosure, a SCR catalyst composition is generally prepared by providing a metal-promoted molecular sieve material. A molecular sieve may be prepared according to various techniques known in the art, for example U.S. Pat. No. 4,544,538 to Zones and U.S. Pat. No. 6,709,644 to Zones, and International Patent Application Publication No. WO 2011/064186 to Bull, which are herein incorporated by reference in their entireties.

To prepare metal-promoted molecular sieves according to various embodiments of the invention, a metal (e.g., copper) is ion exchanged into the molecular sieves. Such metals are generally ion exchanged into alkali metal or $NH_4$ molecular sieves (which can be prepared by $NH_4^-$ ion exchange into an alkali metal molecular sieve by methods known in the art, e.g., as disclosed in Bleken, F. et al. Topics in Catalysis 2009, 52, 218-228, which is incorporated herein by reference).

Preparation of the metal ion-promoted molecular sieves typically comprises an ion-exchange process of the molecular sieves in particulate form with a metal precursor solution. For example, a copper salt can be used to provide copper. When copper acetate is used to provide copper, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2. In specific embodiments, a metal, such as copper, is ion exchanged into alkali metal or $NH_4$-SAPO-34 to form Cu-SAPO-34.

For additional promotion of SCR of oxides of nitrogen, in some embodiments, the molecular sieves can be promoted with two or more metals (e.g., copper in combination with one or more other metals). Where two or more metals are to be included in a metal ion-promoted molecular sieve material, multiple metal precursors (e.g., copper and iron precursors) can be ion-exchanged at the same time or separately. In certain embodiments, the second metal can be exchanged into a molecular sieve material that has first been promoted with the first metal (e.g., a second metal can be exchanged into a copper-promoted molecular sieve material). The second molecular sieve material can vary and, in some embodiments, may be iron or an alkaline earth or alkali metal. Suitable alkaline earth or alkali metals include, but are not limited to, barium, magnesium, beryllium, calcium, strontium, radium, and combinations thereof.

As discussed above, one or more surface deposition methods can be used to coat at least part of the exterior surface of particles of the porous support material with an ultrathin coating. In various embodiments, an atomic layer deposition method can be used to coat the exterior surface of a porous support material (e.g., a SAPO material) with a thin oxide layer coating, wherein the oxide layer does not substantially block the pores of the substrate material. In various embodiments, the ALD process can be run at a process temperature of about 100° C. to about 250° C., or about 120° C. to about 180° C. In certain embodiments, the surface deposition method is run at a process temperature of about 150° C.

Catalyst Article

As noted above, a catalyst article comprising the catalyst composition of the invention exhibits enhanced NO conversion activity. Accordingly, one or more embodiments of the invention provide a catalyst article comprising a calcined catalyst composition as disclosed herein (where at least a portion of an exterior surface of particles of the porous support material is coated with an oxide layer that does not substantially block the pores of the substrate material), characterized by higher low temperature aging stability than exhibited by a comparable catalyst article that does not include a porous support material having an oxide layer applied to at least part of an outside surface of the porous support material.

In certain preferred embodiments, a catalyst article for abatement of exhaust gas emissions from a lean burn engine is provided, the catalyst article comprising a carrier substrate having a length, an inlet end and an outlet end, and a washcoat of an SCR catalyst material on the carrier. The carrier substrate can be selected from a flow-through monolith, a wall-flow monolith, a foam, or a mesh, for example. The catalyst material can comprise a first layer and a second layer.

Carrier Substrate

According to one or more embodiments, the carrier substrate for the catalyst composition may be constructed of any material typically used for preparing automotive catalysts and will typically comprise a metal or ceramic honeycomb structure. The carrier substrate typically provides a plurality of wall surfaces upon which the catalyst washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition associated therewith (e.g., an SCR catalyst composition according to embodiments of the present invention) can permeate into the pore structure of the porous walls (i.e., partially or fully occluding the pore openings) in addition to being disposed on the surface of the walls.

Figure 1:
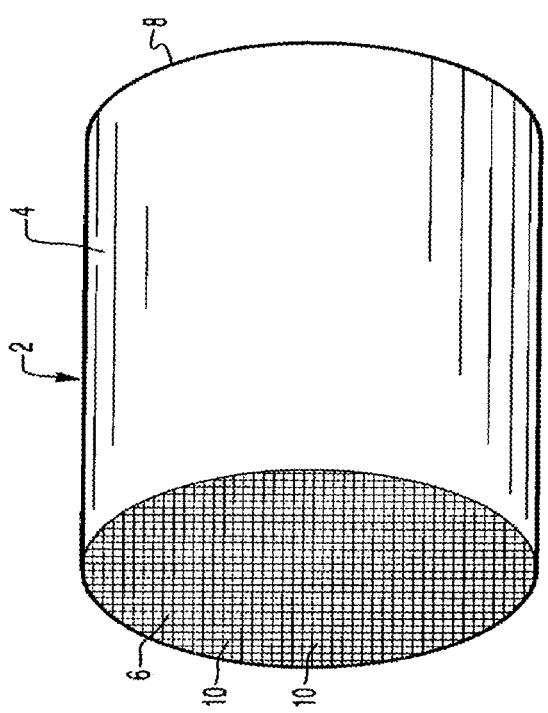
FIG. 1 is a perspective view of a honeycomb-type substrate which may comprise a catalyst washcoat composition in accordance with the present invention.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the two-layer embodiment illustrated in FIG. 2.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the SCR catalyst composition (including the metal-promoted molecular sieve material) on the catalyst substrate, such as a monolithic flow-through substrate, is typically from about 0.5 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Carrier Substrate Coating Process

The catalyst composition can be used in the form of a packed bed of powder, beads, or extruded granules. However, in certain advantageous embodiments, the SCR composition is prepared and coated on a substrate. This method can comprise mixing a catalyst composition as generally disclosed herein with a solvent (e.g., water) to form a slurry for purposes of coating a catalyst substrate. In addition to the catalyst composition (i.e., the metal-promoted molecular sieves), the slurry may optionally contain various additional components. Typical additional components include, but are not limited to, one or more binders and additives to control, e.g., pH and viscosity of the slurry. Particular additional components can include alumina as a binder, hydrocarbon (HC) storage components (e.g., zeolite), associative thickeners, and/or surfactants (including anionic, cationic, non-ionic or amphoteric surfactants) and zirconium acetate. In some embodiments, the pH of the slurry can be adjusted, e.g., to an acidic pH of about 3 to about 5.

When present, an alumina binder is typically used in an amount of about 0.02 $g/in^3$ to about 0.5 $g/in^3$. The alumina binder can be, for example, boehmite, gamma-alumina, or delta/theta alumina, or zirconium acetate.

Optionally, although not common in diesel systems, as noted above, the slurry may contain one or more hydrocarbon (HC) storage component for the adsorption of hydrocarbons (HC). Any known hydrocarbon storage material can be used, e.g., a microporous material such as a zeolite or zeolite-like material. When present, zeolite or other HC storage components are typically used in an amount of about 0.05 $g/in^3$ to about 1 $g/in^3$. When present, an alumina binder is typically used in an amount of about 0.02 $g/in^3$ to about 0.5 $g/in^3$. The alumina binder can be, for example, boehmite, gamma-alumina, or delta/theta alumina.

The slurry can, in some embodiments be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 5 to about 50 microns (e.g., about 5 to about 20 microns or about 10 to about 20 microns). The D90 is defined as the particle size at which about 90% of the particles have a finer particle size.

The slurry is generally coated on the catalyst substrate using a washcoat technique known in the art. As used herein, the term "washcoat" has its usual meaning in the art of a thin, adherent coating of a material applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

A washcoat is generally formed by preparing a slurry containing a specified solids content (e.g., 30-90% by weight) of catalyst material (here, the metal-promoted molecular sieves) in a liquid vehicle, which is then coated onto the substrate (or substrates) and dried to provide a washcoat layer. To coat the wall flow substrates with the catalyst material of one or more embodiments, the substrates can be immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

In one embodiment, the substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

Aging can be conducted under various conditions and, as used herein, "aging" is understood to encompass a range of conditions (e.g., temperature, time, atmosphere). Exemplary aging protocols involve subjecting the calcined coated substrate to a temperature of 750° C. for about 5 hours in 10% steam or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 1000° C., 600° C. to 950° C., or 650° C. to 800° C.); the time may be lesser or greater (e.g., including but not limited to, times of about 1 hour to about 100 hours or about 2 hours to about 50 hours); and the atmosphere can be modified (e.g., to have different amounts of steam and/or other constituents present therein).

The catalyst composition can be applied as a single layer or in multiple layers. A catalyst layer resulting from repeated washcoating of the same catalyst material to build up the loading level is typically viewed as a single layer of catalyst. In another embodiment, the catalyst composition is applied in multiple layers with each layer having a different composition. Additionally, the catalyst composition can be zone-coated, meaning a single substrate can be coated with different catalyst compositions in different areas along the gas effluent flow path.

Emission Treatment System

Selective reduction of nitrogen oxides utilizing catalyst compositions according to the present disclosure is generally carried out in the presence of ammonia or urea. In particular, an SCR system including a catalyst composition prepared according to the methods described herein can be integrated in the exhaust gas treatment system of a vehicle. An exemplary SCR system can include the following components: an SCR catalyst composition as described herein; a urea storage tank; a urea pump; a urea dosing system; a urea injector/nozzle; and a respective control unit.

In some aspects, the present disclosure also can relate to a method for selectively reducing nitrogen oxides ($NO_x$) from a stream, such as an exhaust gas. In particular, the stream can be contacted with a catalyst composition prepared according to the present disclosure. The term nitrogen oxides, or $NO_x$, as used herein encompasses any and all oxides of nitrogen, including but not limited to $N_2O$, NO, $N_2O_3$, $NO_2$, $N_2O_4$, $N_2O_5$, and $NO_3$.

In some embodiments, a catalyst composition as described herein can be effective to provide a $NO_x$ conversion of at least 60%, at least 65%, at least 70%, at least 75%, at least 80%, or at least 85% over a temperature range of about 200° C. to about 600° C., about 250° C. to about 600° C., about 300° C. to about 600° C., about 300° C. to about 550° C., about 300 to about 500° C., or about 350° C. to about 450° C. In particular embodiments, a catalyst composition can be provided to provide a $NO_x$ conversion of at least about 70% at 200° C.

The present invention also provides an emission treatment system that incorporates the SCR catalyst composition or article described herein. The catalyst composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to the engine effluent as well as to the effluent downstream of one or more other catalyst system components as described herein.

For example, the emission treatment system may further comprise a catalyzed soot filter (CSF) component and/or a selective catalytic reduction (SCR) catalytic article. Such optional additional components are typically located downstream from a diesel oxidation catalyst, although the relative placement of the various components of the emission treatment system can be varied. "Downstream" refers to a position of a component in an exhaust gas stream in a path further away from the engine than the preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relative to another component. The treatment system can include further components, such as ammonia oxidation materials, additional particulate filtration components, $NO_x$ storage and/or trapping components, and reductant injectors. The preceding list of components is merely illustrative and should not be taken as limiting the scope of the invention.

The optional CSF may comprise a substrate coated with a washcoat layer containing one or more catalysts for burning trapped soot and/or oxidizing exhaust gas stream emissions. In general, the soot burning catalyst can be any known catalyst for combustion of soot. In the case of passive soot regeneration, the soot burning catalyst can be an oxidation catalyst comprising one or more platinum metal catalysts (e.g., platinum, palladium, and/or rhodium) to promote NO to $NO_2$ oxidation.

EXPERIMENTAL

Aspects of the present invention are more fully illustrated by the following examples, which are set forth to illustrate certain aspects of the present invention and are not to be construed as limiting thereof.

Example 1

SAPO-34 and Cu-SAPO-34 samples were prepared.
Crystallization of SAPO-34:
SAPO-34 sample was synthesized using the following recipe: 547.7 g of di-ionized (DI) water, 200.9 g of 85% $H_3PO_4$ and 118.6 g of alumina were combined in a mixer and left to stir for 1 hour. After 1 hour, 248.2 g of morpholine was added dropwise and then left to stir for an additional 15 minutes. Next, 137.5 g of Ludox AS-40 colloidal silica was added dropwise and left to stir for 30 minutes. The mixed gel was loaded to an autoclave and crystallized at 170° C. for 48 hours. After crystallization, the product was recovered by filtration and was dried at 90° C. overnight.

Preparation of Ammonium Exchanged SAPO-34:
A dried template containing SAPO-34 was calcined at 540° C. for 6 hours to remove the template and then ammonium exchanged. 150 g of the calcined SAPO-34 was suspended in 330 g of an aqueous solution containing 30 g of ammonium nitrate. Next, 30% ammonium hydroxide was added until the pH stabilized at approximately 7. The suspension was diluted with DI water to a total of 530 g and allowed to stir overnight. The suspension was separated by filtration and the cake was washed with DI water. The resulting filter cake was dried at 100° C. overnight.

Preparation of Cu-Exchanged SAPO-34:
36 g of copper acetate hydrate were dissolved in 900 mL of DI water. Next, 225 g of ammonium form SAPO-34 was added to this solution slowly with agitation to give an aqueous suspension. This suspension was heated to 60-80° C. for 2 hours, making sure that the pH remains in the range between 4 and 5. The suspension was then cooled to room temperature and the solids separated by filtration. The filter cake was washed with excess DI water and dried at 120° C. The resulting Cu-SAPO-34 had copper loading of 2.5-3% as CuO.

Example 2

Alumina coated Cu-SAPO-34 samples were prepared.
Two batches of alumina coated Cu-SAPO-34 samples (5 and 10 cycles TMA) were prepared using the Atomic Layer Deposition (ALD) technique with trimethyl aluminum (TMA) precursor. See the process described in U.S. Pat. No. 6,613,383 to George et al., which is herein incorporated by reference. About 120 g of Cu-SAPO-34 powder was loaded into a fluidized bed reactor, heated to 180° C. and dried for about 4 hours, during which the powder desorbed significant amount of water and carbon dioxide. The coating run was then started, and 5 cycles of TMA (ALD alumina) were deposited. The inline residual gas analyzer (RGA) was used to monitor evolved gases, and confirmed species consistent with deposition of alumina. The reactor was then cooled and un-agglomerated, free-flowing powder was recovered. The procedure was repeated, with 10 cycles of ALD alumina deposited on the Cu-SAPO-34 powder. All samples, untreated and coated, were analyzed for surface chemical composition using the XPS technique and for BET surface area. Summary of the ALD coating process and surface chemical composition and BET of the untreated and treated samples are given in Table 1 below. XPS confirmed successful deposition of thin alumina layer on both coated samples, and the BET shows that samples were coated without substantially blocking the pores, preserving most of the original BET.

TABLE 1

ALD process and surface chemical composition (atomic %) of the untreated Cu-SAPO-34 parent and the samples coated with a thin conformal layer of alumina.

| Sample | ALD treated with TMA | Process temperature (° C.) | # of cycles of TMA | Al (%) | Si (%) | BET (m²/g) |
|---|---|---|---|---|---|---|
| A | N | NA | NA | 16.2 | 2.6 | 399 |
| B | Y | 180 | 5 | 25.5 | 1.0 | 383 |
| C | Y | 180 | 10 | 28.3 | 0.7 | 358 |

Example 3

Samples of the Cu-SAPO-34 untreated control, the Cu-SAPO-34 treated with 5 deposition cycles of alumina, and the Cu-SAPO-34 treated with 10 deposition cycles of alumina were tested for SCR performance as fresh and after being hydrothermally aged using two aging protocols. In the high temperature (HT) aging protocol, the samples were aged at 750° C. for 5 hours in 10% steam, in the low temperature (LT) aging protocol, the samples were aged at 95° C. for 24 hours in fully saturated steam atmosphere. The fully saturated steam atmosphere was achieved by impregnating the samples with 150% of incipient wetness volume of water and then heated under reflux conditions.

Fresh and aged samples of the Cu-SAPO-34 untreated control, the Cu-SAPO-34 treated with 5 deposition cycles of alumina, and the Cu-SAPO-34 treated with 10 deposition cycles of alumina were shaped with 5% binder by setting the sample powder to a slurry, adding the binder, and then drying under stirring. The dried mixtures were then calcined for 1 hour at a temperature of about 600° C. and then crushed/sieved to 250-500 μm.

NOx conversion was then measured on a multi-fold powder reactor system. All Cu-SAPO-34 samples were tested in 2 loads with 120 mg per reactor, diluted with corundum. Feed was 500 ppm NO, 500 ppm $NH_3$, 5% $H_2O$ 10% $O_2$, balance $N_2$, with space velocity of 80,000 $h^{-1}$. NOx conversion was monitored in the 175-575° C. range.

Figure 3:
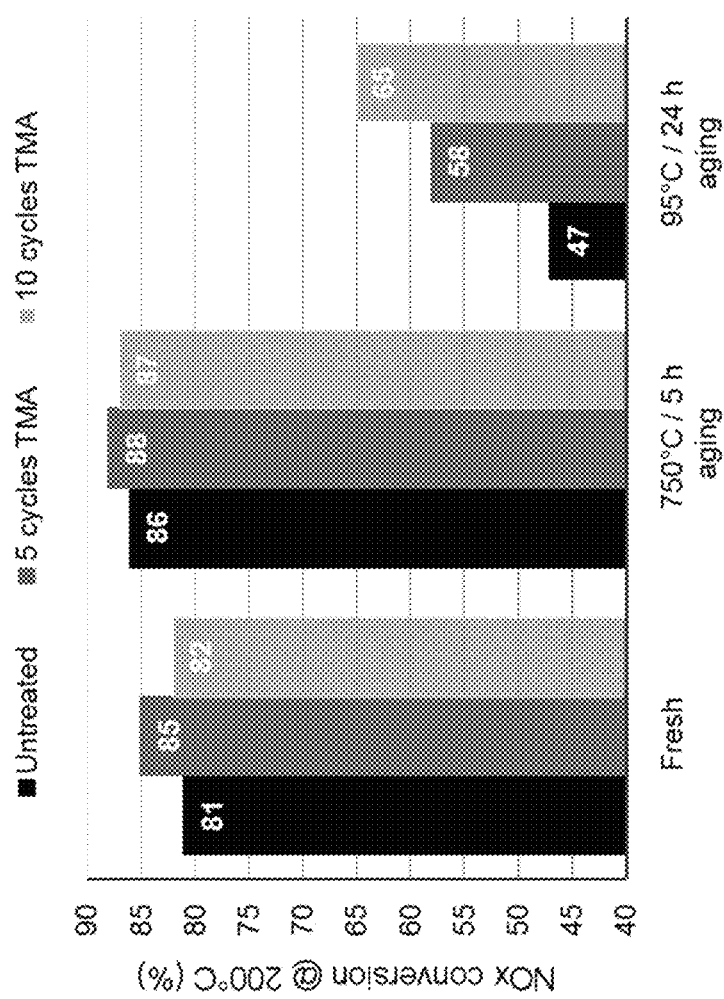
FIG. 3 is a bar graph illustrating a comparison of NOx conversion at 200° C. of Cu-SAPO-34 (untreated) and Cu-SAPO-34 samples treated with 5 deposition cycles of alumina and 10 deposition cycles of alumina.
Figure 4:
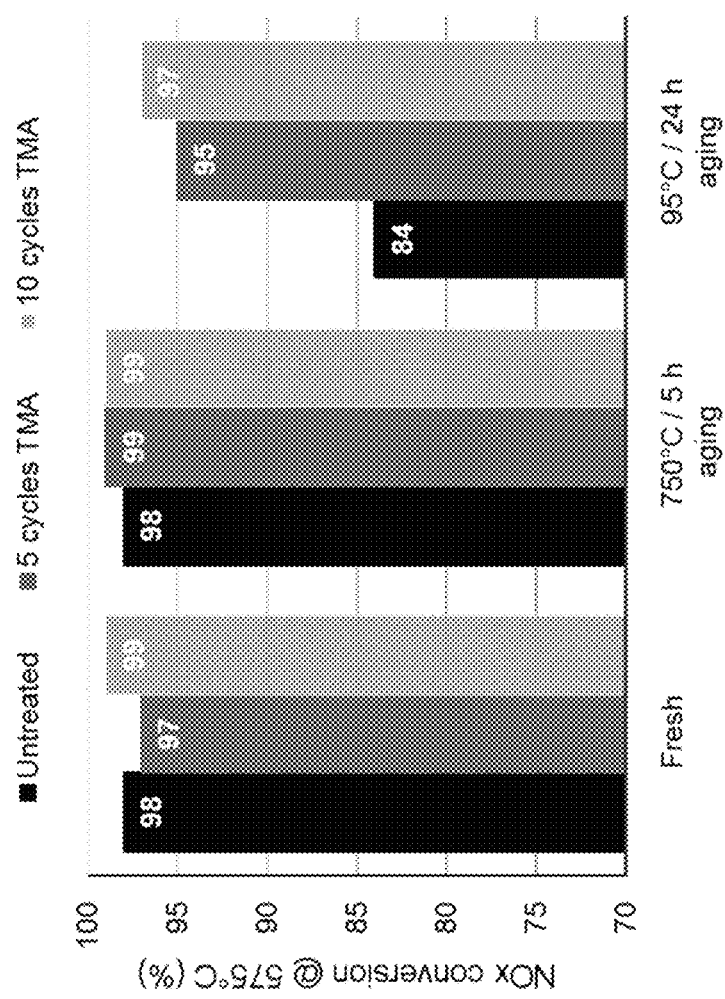
FIG. 4 is a bar graph illustrating a comparison of NOx conversion at 575° C. of Cu-SAPO-34 (untreated) and Cu-SAPO-34 samples treated with 5 deposition cycles of alumina and 10 deposition cycles of alumina.

FIGS. 3 and 4 are bar graphs illustrating a comparison of NOx conversion of Cu-SAPO-34 (untreated) and Cu-SAPO-34 samples treated with 5 deposition cycles of alumina and 10 deposition cycles of alumina at 200° C. (FIG. 3) and at 575° C. (FIG. 4). As illustrated in FIGS. 3 and 4, the untreated Cu-SAPO-34 catalyst shows excellent 200° C. (LT) and 575° C. (HT) NOx conversion both fresh and after aging at 750° C., but there was a significant negative impact on NOx conversion, especially at low temperature, after the sample was aged at 95° C. Both alumina coated catalysts show equally excellent LT and HT performance in fresh and after 750° C. aging, which confirms no negative effect of the coating. However, these samples that were treated with deposition cycles of alumina showed significantly higher NOx conversions (vs. the untreated catalyst) at both temperatures after aging at 95° C. The sample treated with 10 cycles showed the best performance.

Example 4

Following procedures in Examples 1 and 2, another set of Cu-SAPO-34 samples coated with 10 cycles of alumina using ALD were prepared and analyzed to estimate the thickness of the deposited alumina layer using X-ray Photoelectron Spectroscopy (XPS) and high resolution Transmission Electron Microscopy (TEM). In this Example, the samples were coated at 180° C. and 150° C.

Table 2 below shows surface chemical analysis by the XPS for the uncoated parent and the two coated samples. Results show consistent trends in the surface Al, Si, P and Cu concentrations confirming surface enrichment in aluminum in both coated samples, with thicker layer deposited on the sample coated at 150° C.

TABLE 2

Surface chemical composition (atomic %) of the untreated Cu-SAPO-34 parent and the samples coated with a thin conformal layer of alumina (10 cycles) at two different ALD process temperatures.

| Sample | ALD treated with TMA | Process Temp. (° C.) | % of cycles of TMA | Al (%) | Si (%) | P (%) | Cu (%) |
|---|---|---|---|---|---|---|---|
| A | N | NA | NA | 12.9 | 2.7 | 9.0 | 1.6 |
| B | Y | 180 | 10 | 26.4 | 1.0 | 3.1 | ND |
| C | Y | 150 | 10 | 30.4 | 0.4 | 2.1 | ND |

Figure 5:
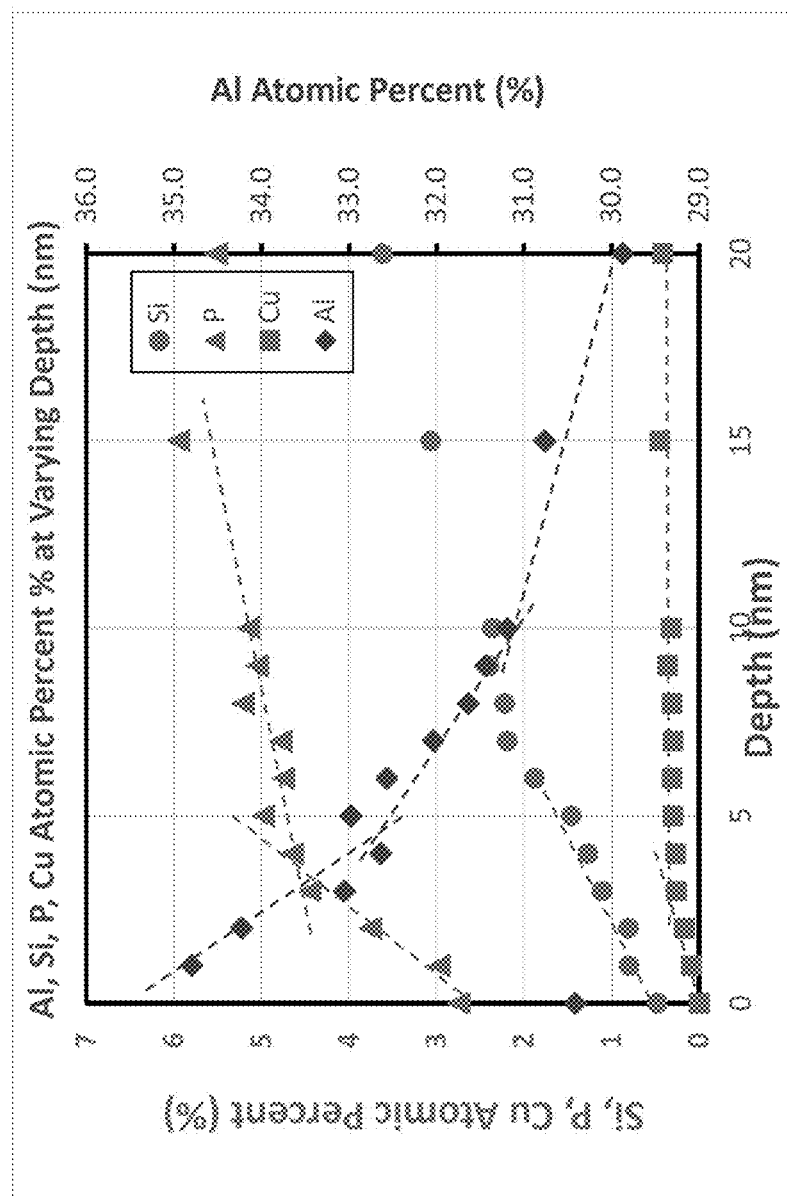
FIG. 5 is a graph illustrating the depth profile (atomic percent) of Al, Cu, Si and P in a catalyst sample coated using ALD with 10 cycles of alumina at 180° C.

A depth profile study using XPS was also done on the sample coated at 180° C. Results showing depth profiles of Al, Si, P and Cu are presented in FIG. 5. The depth profile of 'Al' shows a gradient with highest concentration on the surface and indicating thickness of about 10-20 nm. The other elements show the lowest concentration on the surface with gradual increase to the depth of about 10-20 nm. This confirms 15-20 nm alumina layer in this sample and, consistent with the surface analysis results in Table 2, even thicker layer in the sample coated at 150° C. (20-30 nm).

Figure 6A:
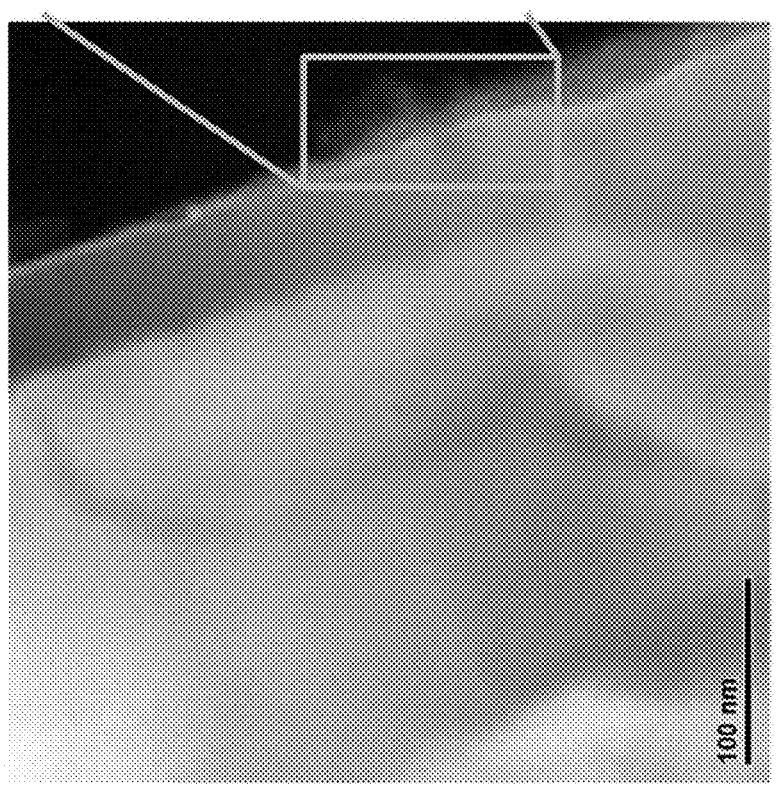
FIGS. 6a and 6b show high resolution TEM images of a Cu-SAPO-34 sample coated at 180° C. with 10 cycles of alumina: a) AC-STEM HAADF image of a thin microtomed section and, b) EDX elemental analysis of the highlighted section.
Figure 6B:
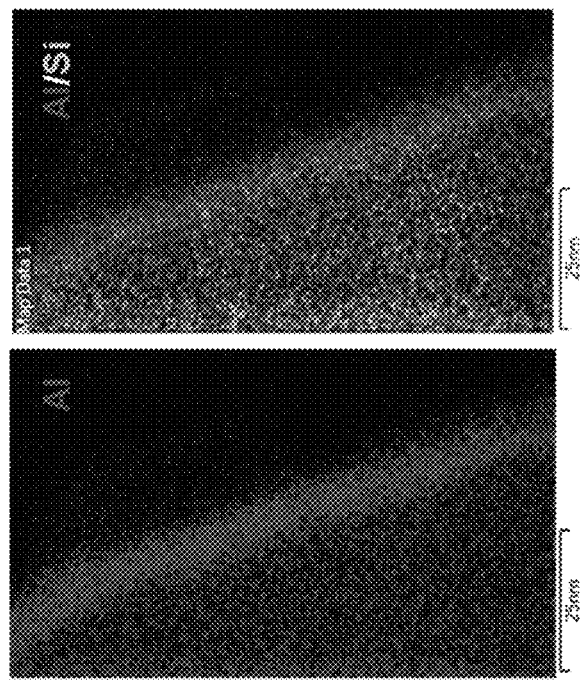

High resolution TEM images of the microtomed thin sections of the sample coated at 180° C. were obtained using AC-STEM HAADF microscope fitted with EDX spectrometer and are shown in FIG. 6. The high-resolution HAADF image clearly shows a thin conformal layer (FIG. 6a) and the EDX analysis (FIG. 6b) of the highlighted section confirms a thin 'Al' layer estimated to be about 10-15 nm thick.

In particular, FIG. 6b shows the elemental mapping (Al and Al/Si) of the highlighted section of FIG. 6a. The Al mapping (left image) shows a significant increase in Al concentration on the surface of the crystal over the average crystal composition, indicating about 15-20 nm layer of alumina deposited by the ALD process. The Al present that is not in the thick coating is the bulk aluminum in the SAPO material to begin with. Without being limited by theory, there should be no aluminum penetration from the ALD process into the pores of the SAPO material because the precursor molecule is too large to fit through the pore opening. In the Al/Si mapping (right image), two compositional regions are clearly visible: mixed red/green representing bulk crystal composition, and strongly Al enriched surface layer with no silica.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed:

1. A catalyst material for abatement of exhaust gas emissions from a lean burn engine, the catalyst material comprising:

a metal-exchanged SAPO-34 material; and an oxide layer at least partially covering an outside surface of the SAPO-34 material;

wherein the oxide layer is not blocking at least about 70% of the pores of the SAPO-34 material, and wherein the oxide layer ranges from approximately 0.1 nm to about 50 nm in thickness.

2. The catalyst material of claim 1, wherein the oxide layer comprises at least one of $Al_2O_3$, $SiO_2$, $ZrO_2$, and $TiO_2$.

3. The catalyst material of claim 1, wherein the oxide layer ranges from approximately 0.1 nm to 15 nm in thickness.

4. The catalyst material of claim 1, wherein the metal is chosen from Cu, Fe, Co, Ce, Mn, and Ni.

5. The catalyst material of claim 1, wherein the metal is Cu present at a loading ranging from 2% and 8% by weight.

6. A catalytic article comprising the catalyst material of claim 1, in a washcoat deposited on a honeycomb substrate.

7. The catalytic article of claim 6, wherein the honeycomb substrate comprises a wall flow filter substrate.

8. The catalytic article of claim 7, wherein the honeycomb substrate comprises a flow through substrate.

9. An exhaust gas treatment system comprising the catalytic article of claim 6 disposed downstream from a diesel engine and a reductant source that adds a reductant to an exhaust gas stream from the engine.

10. A process for modifying a selective catalytic reduction catalyst material comprising a metal-exchanged SAPO-34 material, the process comprising:

using at least one cycle of a surface deposition method to deposit an oxide layer on at least a portion of an exposed outer surface of the SAPO-34 material, wherein the oxide layer does not substantially block the pores of the SAPO-34 material; and wherein the modified selective catalytic reduction catalyst material is a catalyst material according to claim 1.

11. The process of claim 10, wherein the surface deposition method is chosen from-atomic layer deposition (ALD), chemical vapor deposition (CVD), particle vapor deposition (PVD), ion-beam assisted deposition (IBAD), and combinations thereof.

12. The process of claim 10, wherein at least 60% of the exposed outer surface of the SAPO-34 material is coated with the oxide layer.

13. The process of claim 10, wherein the oxide layer comprises one or more of $Al_2O_3$, $SiO_2$, $ZrO_2$, and $TiO_2$.

14. The process of claim 10, wherein the oxide layer deposited in the at least one cycle ranges from approximately 0.1 nm to about 1 nm in thickness.

15. The process of claim 10, wherein 5 deposition cycles are used to deposit the oxide layer.

16. The process of claim 10, wherein 10 deposition cycles are used to deposit the oxide layer.

17. The process of claim 10, wherein the surface deposition method is run at a process temperature ranging from about 100° C. to about 250° C.

18. The process of claim 10, wherein the surface deposition method is run at a process temperature ranging from about 120° C. to about 180° C.

19. The process of claim 10, wherein the surface deposition method is run at a process temperature of about 150° C.

20. The process of claim 10, wherein the metal is chosen from Cu, Fe, Co, Ce, Mn and Ni.

21. The process of claim 10, wherein the metal is Cu present at a loading ranging from 2% and 8% by weight of the metal-exchanged SAPO-34 material.

* * * * *